US006713576B1

(12) United States Patent
Nagy et al.

(10) Patent No.: US 6,713,576 B1
(45) Date of Patent: Mar. 30, 2004

(54) OLEFIN POLYMERIZATION CATALYSTS BASED ON CONVEX, POLCYCLIC LIGANDS

(75) Inventors: Sandor Nagy, Naperville, IL (US); Jonathan L. Schuchardt, Royersford, PA (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/373,943

(22) Filed: Feb. 25, 2003

(51) Int. Cl.⁷ .............................. C08F 4/44; C08F 4/62; C08F 4/64; C08F 4/70
(52) U.S. Cl. .................. 526/160; 526/134; 526/943; 526/170; 502/103; 502/117; 502/152; 556/53
(58) Field of Search ................................ 502/103, 117, 502/152; 526/160, 170, 134, 943

(56) References Cited

U.S. PATENT DOCUMENTS

| | | | |
|---|---|---|---|
| 5,153,157 A | 10/1992 | Hlatky et al. | 502/117 |
| 5,198,401 A | 3/1993 | Turner et al. | 502/155 |
| 5,241,025 A | 8/1993 | Hlatky et al. | 526/129 |
| 5,414,180 A | 5/1995 | Geerts et al. | 585/525 |
| 5,554,775 A | 9/1996 | Krishnamurti et al. | 556/7 |
| 5,637,660 A | 6/1997 | Nagy et al. | 526/160 |
| 5,648,440 A | 7/1997 | Sugano et al. | 526/132 |
| 5,902,866 A | 5/1999 | Nagy et al. | 526/133 |
| 6,211,311 B1 | 4/2001 | Wang et al. | 526/131 |
| 6,232,260 B1 | 5/2001 | Nagy et al. | 502/155 |

FOREIGN PATENT DOCUMENTS

JP 10167994 6/1998

OTHER PUBLICATIONS

Chin et al., Organometallics 21 (2000) 2027–2029.*
Eiichi et al., Patent Abstracts of Japan, Publication No. 10–167994 (1998).*
Rabideau and Sygula et al., Acc. Chem. Res. 29 (1996) 235.
Sygula et al., Tetrahedron 57 (2001) 3637.
Sygula et al., J. Am. Chem. Soc. 122 (2000) 6323.
Scott et al., Org. Lett. 2 (2000) 1427.
Sawamura et al., J. Am. Chem. Soc. 118 (1996) 12850.
Sawamura et al., Chem. Letters (2000) 270.
Chin et al., Organometallics 21 (2002) 2027.
Sygula et al., J. Org. Chem. 67 (2002) 6487.
Borchardt et al., J. Am. Chem. Soc. 114 (1992) 1921.
Rabideau et al., Tetrahedron Lett. 34 (1993) 6351.
Scott et al., J. Am. Chem. Soc. 124 (2002) 8870.
Schlosser et al., AgnewChem., I.E. Engl. 12 (1973) 508.
Lochmann et al., Tetrahedron Lett. (1966) 257.
J. March, Advanced Organic Chemistry, 2d Ed. (1977), p. 533.

* cited by examiner

Primary Examiner—Roberto Rabago
(74) Attorney, Agent, or Firm—Jonathan L. Schuchardt

(57) ABSTRACT

A catalyst system useful for polymerizing olefins is disclosed. The catalyst system includes an organometallic complex that incorporates a Group 3 to 10 transition metal and an anionic, polycyclic, convex ligand. Molecular modeling results indicate that the complexes, when combined with an activator, should actively polymerize olefins. The convex ligand uniquely stabilizes the active site while simultaneously minimizing steric interference. Calculations predict that complexes based on ligands with a high curvature index will have favorable reactivities with olefin monomers compared with similar complexes that incorporate Cp-like ligands.

11 Claims, No Drawings

OLEFIN POLYMERIZATION CATALYSTS BASED ON CONVEX, POLCYCLIC LIGANDS

FIELD OF THE INVENTION

The invention relates to catalysts useful for olefin polymerization. In particular, the invention relates to catalysts based on organometallic complexes that incorporate a convex, polycyclic ligand.

BACKGROUND OF THE INVENTION

While Ziegler-Natta catalysts are a mainstay for polyolefin manufacture, single-site (metallocene and non-metallocene) catalysts represent the industry's future. These catalysts are often more reactive than Ziegler-Natta catalysts, and they often produce polymers with improved physical properties.

Many single-site catalysts incorporate cyclopentadienyl, indenyl, or fluorenyl ligands (hereinafter "Cp-like ligands"). In these catalysts, the Cp-like ligand is planar or substantially planar (i.e., the calculated curvature index of the ligand is 0 or close to 0) and donates pi electrons to a transition metal center (sometimes referred to as η-5 coordination). Because it contributes pi electrons to the metal, the ligand stabilizes the cationic active site during polymerization. At the same time, however, the bulky ligand inhibits pi-complexation of olefin to the metal and interferes with polymer chain propagation. Ideally, the ligand would stabilize the active site electronically with minimal steric inhibition of olefin complexation and chain growth.

Outside the area of olefin polymerization catalysis, there is considerable theoretical and practical interest in fullerenes, especially buckminsterfullerene, other "buckyballs," "buckybowls," and other hydrocarbons that have pi electron density distributed over a curved surface (see, e.g., Rabideau and Sygula et al., Acc. Chem. Res. 29 (1996) 235; Tetrahedron 57 (2001) 3637; J. Am. Chem. Soc. 122 (2000) 6323; and Scott et al., Org. Lett. 2 (2000) 1427). These molecules are polycyclic and—in contrast to the Cp-like compounds discussed above—they are nonplanar. Corannulenes and other "buckybowls" have been synthesized and studied.

Nakamura, Sawamura, and coworkers reported the preparation of pentahaptofullerene metal complexes (see, e.g., J. Am. Chem. Soc. 118 (1996) 12850 and Chem. Letters (2000) 270). Conjugate addition using a large excess (25–60 equivalents) of an organocuprate reagent, followed by inverse quenching, gives a pentaalkylated cyclopentadienyl precursor. The precursor can be deprotonated and combined with a transition metal source to generate a fullerene-cyclopentadienyl complex. The complexes have been suggested to have potential utility for ethylene polymerizations (see Patent Abstracts of Japan, Publ. No. 10-167994). In spite of the interesting work performed in this area to date, "buckyballs" remain expensive and challenging to synthesize.

Recently, Chin et al. (Organometallics 21 (2002) 2027) described the synthesis of a zirconium complex that incorporates an anionic, bowl-shaped corannulene-like ligand. As the authors note, the "bowl-shaped ligand has two sides due to the curvature of the molecule: an endo (concave) and an exo (convex) side." By X-ray diffraction, it was found that the zirconium coordinates to the convex side of the ligand:

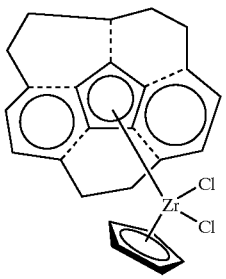

The corranulene ligand used by Chin is reminiscent of a fluorenyl group, which is a common element of single-site olefin polymerization catalysts. Unlike a fluorenyl ligand, however, the corranulenyl ligand is curved because of the three annealed cyclohexane rings around the central cyclopentadienyl moiety. Chin reports structural details, but does not suggest using the complex with an activator to polymerize olefins.

The polyolefins industry continues to need new polymerization catalysts. In particular, the industry needs catalysts having activities that are as good or better than the activities of single-site catalysts based on Cp-like ligands. A valuable catalyst would incorporate ligands that can stabilize a cationically active site (as a Cp-like ligand does) without sacrificing reactivity toward olefin monomers. Ideally, the catalysts could be made economically using well-established synthetic routes.

SUMMARY OF THE INVENTION

The invention is a catalyst system useful for polymerizing olefins. The catalyst system comprises an activator and an organometallic complex. The complex incorporates a Group 3–10 transition metal and an anionic, polycyclic, convex ligand that is pi-bonded to the metal.

Molecular modeling studies reveal that organometallic complexes incorporating such convex ligands, when combined with an activator such as MAO, should actively polymerize olefins. The convex ligand uniquely stabilizes the active site by donating pi electrons while simultaneously minimizing steric interference with olefin complexation and chain growth. Interestingly, the calculations predict that complexes from ligands with a high curvature index (>25) should have favorable reactivities with olefin monomers compared with similar complexes that incorporate Cp-like ligands. The invention enables the production of next-generation olefin polymerization catalysts.

DETAILED DESCRIPTION OF THE INVENTION

Catalyst systems of the invention include an organometallic complex and an activator. The complex contains a Group 3–10 transition metal. "Transition metal" as used herein includes, in addition to the main transition group elements, elements of the lanthanide and actinide series. More preferred complexes include a Group 4 or a Group 8 to 10 transition metal.

The organometallic complex includes an anionic, polycyclic, convex ligand. The ligand is "anionic," and is thus able to donate electrons to and satisfy the valence of a positively charged transition metal. Preferred ligands incorporate a cyclopentadienyl moiety and are monoanionic.

By "polycyclic," we mean that the ligand has multiple carbocyclic rings. In preferred convex ligands, a central five-membered ring, six-membered ring, or carbon-carbon double bond is surrounded by at least three, and preferably at least five, rings. The rings may be exclusively aromatic, exclusively non-aromatic, or a combination of these.

The ligands are also convex. By "convex," we mean that the ligands are—like a chemist's watch glass—non-planar. They have both concave and convex pi-surfaces and a high degree of strain energy (see Scott et al., *Org. Lett.* 2 (2000) 1427) compared with planar anions. The ligands are also "convex" because the transition metal bonds to the convex (exo) surface of the ligand, as is illustrated by complex 4 in Chin et al., *Organometallics* 21 (2002) 2027.

Spherical anions, such as those derived from buckminsterfullerene and other "buckyballs" (as described by Sawamura and Nakamura in *J. Am. Chem. Soc.* 118 (1996) 12850 and *Chem. Letters* (2000) 270), are excluded from our definition of "convex" ligands. (Note that spherical anions lack a concave pi-surface.) While spherical anions can be made, their preparation and purification remains considerably more challenging compared with methods for making and isolating convex ligands, and the possible benefits arising from using spherical ligands for olefin polymerization catalysis remain unclear.

The framework of the convex ligand can be substituted with other atoms that do not interfere with the ability of the anionic ligand to form complexes with transition metals. For example, the framework of the convex ligand can be substituted with alkyl, aryl, halide, alkoxy, thioether, alkylsilyl, or other groups. As an example, alkylated corannulenes are conveniently prepared by the recently reported two-step method of Sygula et al. (*J. Org. Chem.* 67 (2002) 6487).

Suitable convex ligands include, for example, perannulated cyclopentadienyls—including annulated indenyls and annulated flurorenyls—as well as boracorannulenyls and the like. The convex ligand has a curvature index at the cyclopentadienyl fragment greater than zero. Preferably, the convex ligand has a curvature index greater than 15, and most preferably greater than 25. "Curvature index" is the average angle (in degrees) between the plane of the cyclopentadienyl ring fragment and the bonds to the five atoms that are covalently attached to the cyclopentadienyl carbons.

Convex ligands can be made by any suitable method. Synthetic routes to many convex ligand precursors are already known, thanks largely to Professors Rabideau, Sygula, Scott, Chin, and coworkers. Preferably, the precursors contain (or are readily modified to contain) an acidic hydrogen that can be removed to generate a stable carbanion. More preferably, deprotonation of the precursor generates a cyclopentadienyl anion that is conjugated with one or more additional pi-systems on the convex surface of the ligand. For examples of suitable methods for making the convex ligand precursors, including numerous routes to corannulenes and other "buckybowls," see *Org. Lett.* 2 (2000) 1427; *Organometallics* 21 (2002) 2027; *J. Am. Chem. Soc.* 114 (1992) 1921; *Tetrahedron Lett.* 34 (1993) 6351; *Tetrahedron* 57 (2001) 3637; *Acc. Chem. Res.* 29 (1996) 235; *J. Am. Chem. Soc.* 122 (2000) 6323; and *J. Am. Chem. Soc.* 124 (2002) 8870.

In one convenient approach (see *Organometallics* 21 (2002) 2027), a corannulene is converted to a convex, fluorenyl precursor by performing a dissolving metal reduction in tetrahydrofuran, followed by inverse quenching with saturated aqueous ammonium chloride and hydrogenation of the isolated carbon-carbon double bond (see also Example 1, below). Deprotonation gives a convex anion that can be incorporated into an organometallic complex.

The convex ligand precursors are conveniently deprotonated with a potent base according to well-known methods. Suitable bases include, for example, alkyllithium compounds (e.g., methyllithium or n-butyllithium), alkali metals (e.g., sodium metal), alkali metal hydrides (e.g., potassium hydride), and Grignard reagents (e.g., methyl magnesium chloride or phenyl magnesium bromide). Particularly preferred deprotonating agents are super-basic reagents prepared by the reaction of alkyllithium compounds and alkali metal t-butoxides, as reported by Schlosser et al. (*Angew. Chem., I.E. Engl.* 12 (1973) 508) and Lochmann et al. (*Tetrahedron Lett.* (1966) 257).

Usually, about one equivalent of the deprotonating agent and about one equivalent of the precursor are used to produce the anionic convex ligand. Deprotonation can be performed at any suitable temperature, preferably at or below room temperature. While the deprotonation reaction can be performed at temperatures as low as $-78°$ C. or below, it is preferred to perform this step at room temperature.

An alternative to deprotonation involves adding a nucleophilic reagent to a convex, fulvene-like precursor to generate a ligand that incorporates a cyclopentadienyl anion. This approach is illustrated by Examples 3 and 4 below. Addition of an alkyllithium or Grignard reagent to a carbon-carbon double bond of 7 or 10 should produce an alkylated curved anion that incorporates a cyclopentadienyl moiety. Reaction with a transition metal source such as cyclopentadienylzirconium trichloride should give the desired complex in one pot.

In addition to the convex ligand, the organometallic complex may include additional labile anionic ligands such as halides, alkyls, alkaryls, aryls, dialkylaminos, or the like. Particularly preferred are halides, alkyls, and alkaryls (e.g., chloride, methyl, benzyl). Polymerization-stable ligands, such as cyclopentadienyl, indenyl, fluorenyl, boraaryl, indolyl, indenoindolyl, quinolinoxy, pyridinoxy, or the like, can also be present. For examples of the heteroaryl ligands, see U.S. Pat. Nos. 5,554,775, 5,902,866, 5,637,660, and 6,232,260, the teachings of which are incorporated herein by reference.

The organometallic complexes are prepared according to methods that are well known in the art. In general, the complexes are made by combining the anionic convex ligand with a transition metal source. Any convenient source of transition metal can be used. For example, the complexes can be made from transition metal halides, alkyls, alkoxides, acetates, amides, or the like. A particularly convenient source of the transition metal is the transition metal halide. For example, one can use titanium tetrachloride, zirconium tetrachloride, cyclopentadienylzirconium trichloride, vanadium(III) chloride-tetrahydrofuran complex ($VCl_3$ $(THF)_3$), titanium (III) chloride-THF complex, chromium (III) chloride-THF complex, cobalt(II) chloride, nickel(II) bromide, platinum(II) chloride, allylnickel(II) chloride dimer, palladium(II) chloride, lanthanum(III) chloride, titanium(III) acetate, or the like. Complexes can also be prepared from salts with labile groups, such as tetrakis (acetonitrile)palladium(II) bis(tetrafluoroborate).

The transition metal complexes are easy to make. Usually, the transition metal source (halide, e.g.) is dissolved or suspended in an organic solvent and the anionic convex ligand is carefully added at any desired temperature, preferably from about $-78°$ C. to about room temperature. Refluxing is used if needed to complete the reaction. Insoluble by-products, if any, can be removed by filtration, solvents are evaporated, and the transition metal complex is isolated, washed, and dried. The resulting complex can generally be used without further purification. Examples 1–4 below illustrate a few suitable methods making the organometallic complexes.

In sum, a wide variety of organometallic complexes incorporating convex ligands are readily accessible for use in catalyst systems of the invention. The complexes and methods discussed herein for making them are merely illustrative, and those skilled in the art will readily recognize or devise many alternative synthetic methodologies.

The catalyst systems include an activator. Suitable activators help to ionize the organometallic complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain non-nucleophilic anions. These compounds generally consist of bulky ligands attached to boron or aluminum. Examples include lithium tetrakis(pentafluorophenyl) borate, lithium tetrakis(pentafluorophenyl)aluminate, anilinium tetrakis(penta-fluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl) borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference.

The optimum amount of activator needed relative to the amount of organometallic complex depends on many factors, including the nature of the complex and activator, whether a supported catalyst is used, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 10 to about 500 moles, of aluminum per mole of transition metal, M. When the activator is an organoborane or an ionic borate or aluminate, the amount used will be within the range of about 0.01 to about 5000 moles, preferably from about 0.1 to about 500 moles, of activator per mole of M.

The activator is normally added to the reaction mixture at the start of the polymerization. However, when a supported catalyst system is used, the activator can be deposited onto the support along with the organometallic complex.

The catalyst systems are optionally used with an inorganic solid or organic polymer support. Suitable supports include silica, alumina, silica-aluminas, magnesia, titania, clays, zeolites, or the like. The support is preferably treated thermally, chemically, or both prior to use to reduce the concentration of surface hydroxyl groups. Thermal treatment consists of heating (or "calcining") the support in a dry atmosphere at elevated temperature, preferably greater than about 100° C., and more preferably from about 150 to about 600° C., prior to use. A variety of different chemical treatments can be used, including reaction with organo- aluminum, -magnesium, -silicon, or -boron compounds. See, for example, the techniques described in U.S. Pat. No. 6,211,311, the teachings of which are incorporated herein by reference.

The complex and activator can be deposited on the support in any desired manner. For instance, the components can be dissolved in a solvent, combined with a support, and stripped. Alternatively, an incipient-wetness technique can be used. Moreover, the support can simply be introduced into the reactor separately from the complex and activator.

The loading of complex on the support varies depending upon a number of factors, including the identities of the complex and the support, the type of olefin polymerization process used, the reaction conditions, and other concerns. Usually, the amount of complex used is within the range of about 0.01 to about 10 wt. % of transition metal based on the amount of supported catalyst. A more preferred range is from about 0.1 to about 4 wt. %.

Catalyst systems of the invention are useful for polymerizing olefins. Preferred olefins are ethylene and $C_3$–$C_{20}$ α-olefins such as propylene, 1-butene, 1-hexene, 1-octene, and the like. Mixtures of olefins can be used. Ethylene and mixtures of ethylene with $C_3$–$C_{10}$ α-olefins are especially preferred.

Many types of olefin polymerization processes can be used. Preferably, the process is practiced in the liquid phase, which can include slurry, solution, suspension, or bulk processes, or a combination of these. High-pressure fluid phase or gas phase techniques can also be used. The process of the invention is particularly valuable for solution and slurry processes.

The olefin polymerizations can be performed over a wide temperature range, such as about −30° C. to about 280° C. A more preferred range is from about 30° C. to about 180° C.; most preferred is the range from about 60° C. to about 100° C. Olefin partial pressures normally range from about 15 psig to about 50,000 psig. More preferred is the range from about 15 psig to about 1000 psig.

The following examples merely illustrate the invention. Those skilled in the art will recognize many variations that are within the spirit of the invention and scope of the claims.

EXAMPLE 1

Preparation of Organometallic Complex 1

The procedure of Chin et al. (*Organometallics* 21 (2002) 2027)) is used to produce complex 1 from corannulene. Thus, corannulene is first converted to hexahydrocorannulene (6) by dissolving metal reduction using metallic sodium and liquid ammonia in tetrahydrofuran at −33° C., followed by inverse quenching with aqueous ammonium chloride. The isolated carbon-carbon double bond is hydrogenated using Crabtree's catalyst ((1,5-cyclooctadiene)(pyridine)(tricyclohexylphosphine)iridium(I) hexafluorophosphate) and one atmosphere of hydrogen gas. Deprotonation with n-butyllithium in diethyl ether, followed by addition of cyclopentadienylzirconium trichloride gives the desired complex, 1.

EXAMPLE 2

Preparation of Organometallic Complex 5

The method of Rabideau and Sygula (*Acc. Chem. Res.* 29 (1996) 235) is used to make the cyclopentacorannulene, 2. Dissolving metal reduction using sodium and liquid ammonia in tetrahydrofuran at −33° C. according to the method of Rabideau et al. (*Tetrahedron Lett.* 34 (1993) 6351) should give 3. Catalytic hydrogenation of both carbon-carbon double bonds using Crabtree's catalyst and hydrogen gas as described by Rabideau should give convex ligand precursor 4. Deprotonation of 4 with n-butyllithium in diethyl ether, followed by addition of one equivalent of cyclopentadienylzirconium trichloride at room temperature, should produce an organometallic complex having structure 5:

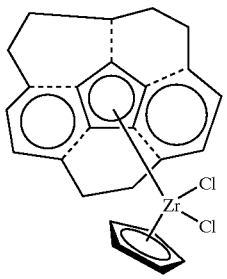

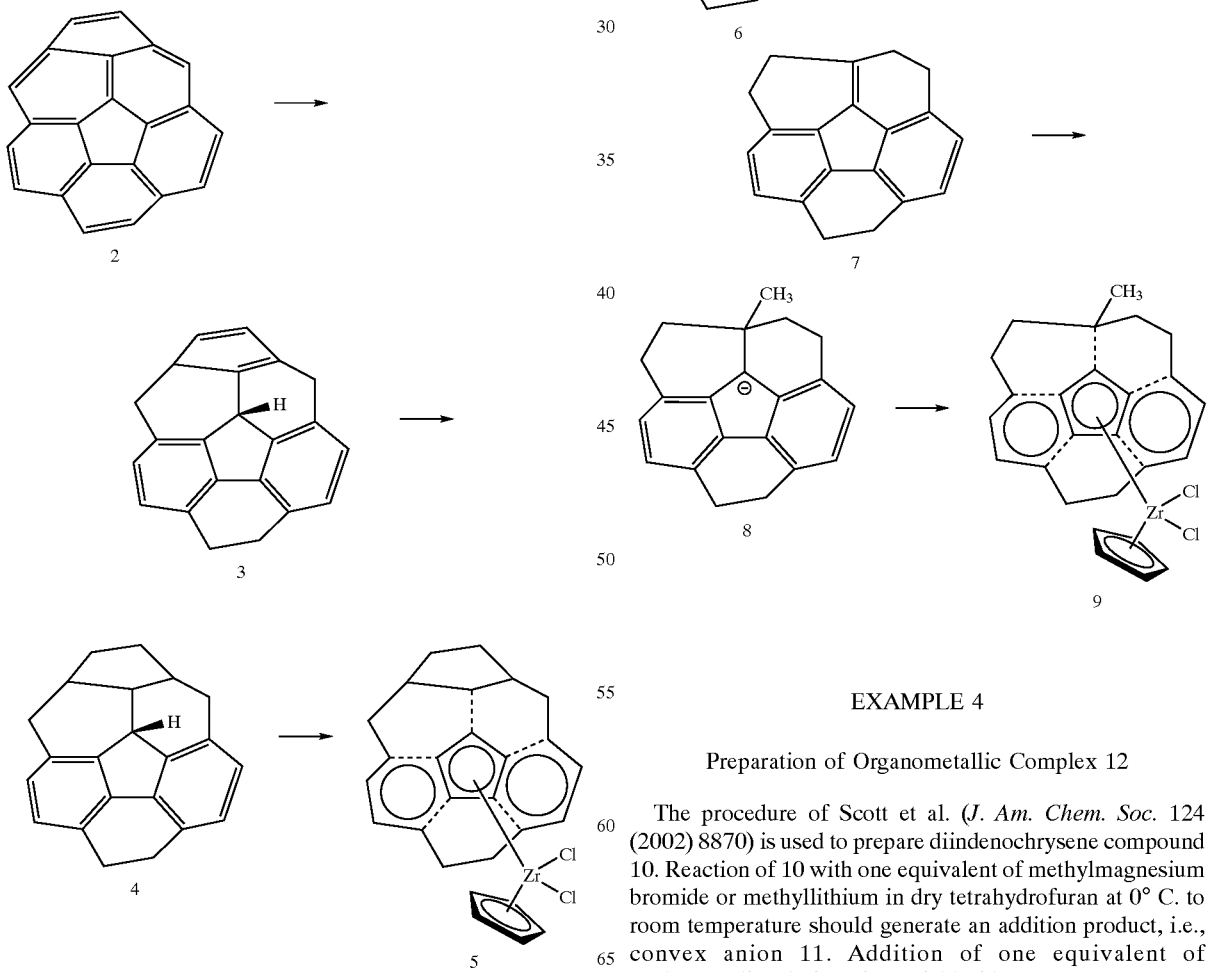

EXAMPLE 3

Preparation of Organometallic Complex 9

Corannulene is first converted to hexahydrocorannulene 6 by dissolving metal reduction using metallic sodium and liquid ammonia in tetrahydrofuran at −33° C., followed by inverse quenching with aqueous ammonium chloride. Treatment of 6 with catalytic potassium tert-butoxide in dimethylsulfoxide at 50–70° C. (see J. March, *Advanced Organic Chemistry*, 2d Ed. (1977), p. 533) should induce double bond migration and give, after conventional workup with water and diethyl ether, dibenzofulvene compound 7. Reaction of 7 with one equivalent of methylmagnesium bromide or methyllithium in dry tetrahydrofuran at 0° C. to room temperature should generate an addition product, i.e., convex anion 8. Addition of cyclopentadienylzirconium trichloride to 8 should generate complex 9, an alkylated analog of 1.

EXAMPLE 4

Preparation of Organometallic Complex 12

The procedure of Scott et al. (*J. Am. Chem. Soc.* 124 (2002) 8870) is used to prepare diindenochrysene compound 10. Reaction of 10 with one equivalent of methylmagnesium bromide or methyllithium in dry tetrahydrofuran at 0° C. to room temperature should generate an addition product, i.e., convex anion 11. Addition of one equivalent of cyclopentadienyl-zirconium trichloride to 11 at room temperature should generate complex 12 in one pot from 10.

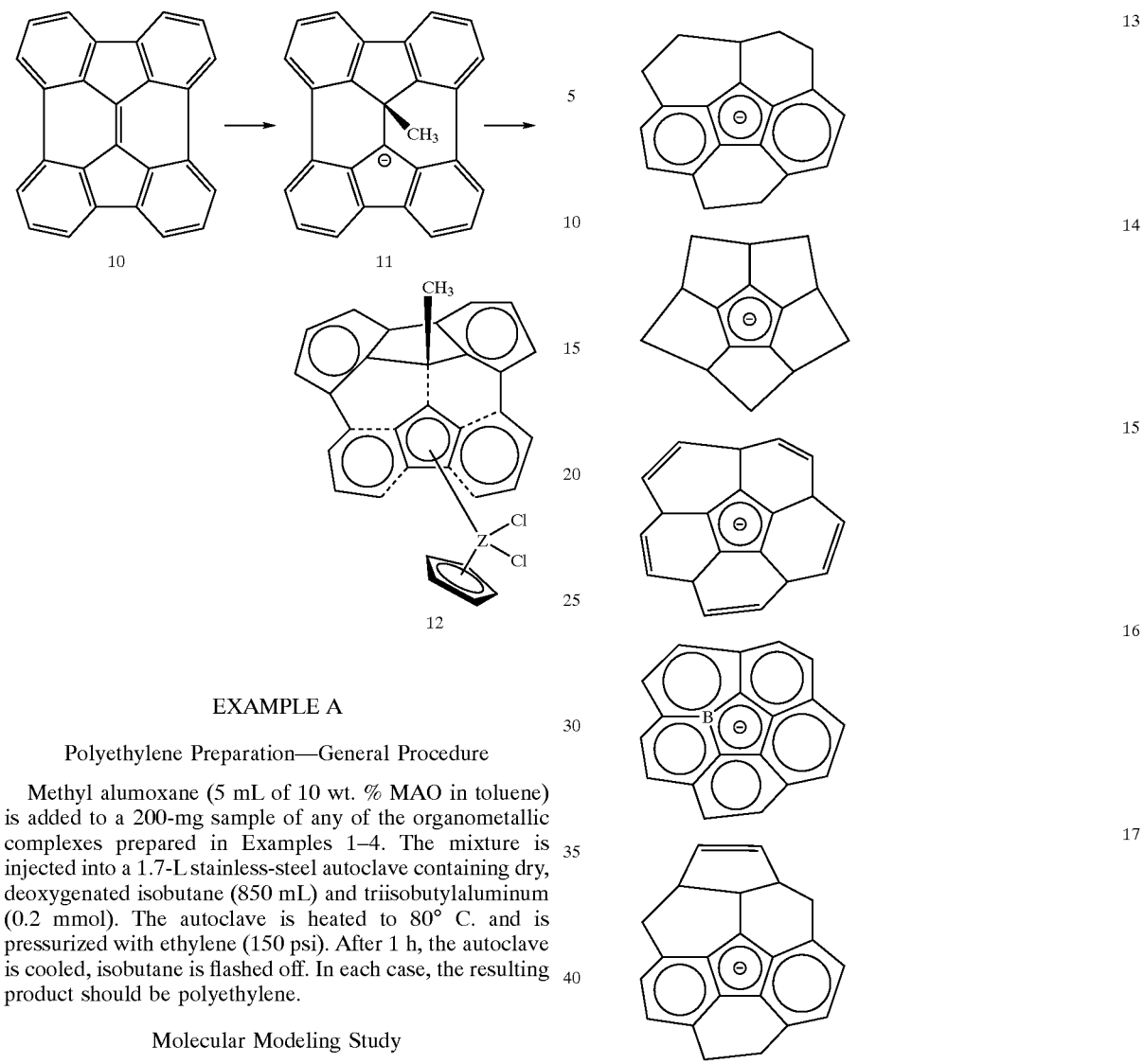

EXAMPLE A

Polyethylene Preparation—General Procedure

Methyl alumoxane (5 mL of 10 wt. % MAO in toluene) is added to a 200-mg sample of any of the organometallic complexes prepared in Examples 1–4. The mixture is injected into a 1.7-L stainless-steel autoclave containing dry, deoxygenated isobutane (850 mL) and triisobutylaluminum (0.2 mmol). The autoclave is heated to 80° C. and is pressurized with ethylene (150 psi). After 1 h, the autoclave is cooled, isobutane is flashed off. In each case, the resulting product should be polyethylene.

Molecular Modeling Study

Additional evidence for the suitability of convex, polycyclic anions as ligands for olefin polymerization catalysts comes from molecular modeling studies. All calculations have been performed with complete geometry optimization using the DFT model B3LYP with the LACVP** pseudopotential basis set as incorporated into the TITAN™ software package.

To estimate the effect of convex ligands (L) on the relative stability of the zirconocenium active sites, we use the relative enthalpy ($\Delta\Delta H_f$) of the reaction:

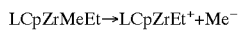

compared with the enthalpy of a standard process in which the zirconium is bonded to two cyclopentadienyl ligands:

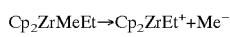

According to these estimates (Table 1), convex anions 13–17 should stabilize an electrophilic active site more effectively than a cyclopentadienyl ligand. Convex anions 14–16 should provide stabilization that is comparable to an indenyl or fluorenyl ligand, while anions 13 and 17 should stabilize an electrophilic site more effectively than indenyl or fluorenyl.

TABLE 1

| Complex | $\Delta\Delta H_f$, kcal/mole |
|---|---|
| Cp$_2$ZrMeEt | 0 |
| (Ind)(Cp)ZrMeEt | −5.0 |
| (Flu)(Cp)ZrMeEt | −7.7 |
| (13)(Cp)ZrMeEt | −11.0 |
| (14)(Cp)ZrMeEt | −9.0 |
| (15)(Cp)ZrMeEt | −7.0 |
| (16)(Cp)ZrMeEt | −6.0 |
| (17)(Cp)ZrMeEt | −10.5 |

The increased stability of the active site for the complexes based on convex anionic ligands permits a high concentration of active sites in the polymerization process, which should produce a more active catalyst.

Remarkably, the increased stability of the zirconocenium cation with the convex anionic ligand should have little impact (<3 kcal/mole) on its reactivity toward ethylene as characterized by the calculated heat of interaction upon pi-complexation (Table 2). Active sites from complexes that incorporate convex anions 14 and 16 have lower estimated energies of pi-complexation compared with the corresponding cyclopentadienyl, indenyl, or fluorenyl complexes.

TABLE 2

| Active site | Relative heat of interaction of active site with ethylene, kcal/mol |
|---|---|
| $Cp_2ZrEt+$ | 0 |
| (Ind)(Cp)ZrEt+ | 2.0 |
| (Flu)(Cp)ZrEt+ | 2.0 |
| (13)(Cp)ZrEt+ | 3.1 |
| (14)(Cp)ZrEt+ | −0.2 |
| (15)(Cp)ZrEt+ | 1.3 |
| (16)(Cp)ZrEt+ | −0.3 |
| (17)(Cp)ZrEt+ | 2.2 |

The ability of convex ligands to stabilize active sites while maintaining good reactivity toward olefin monomer correlates well with the curvature index of the convex ligand. As shown in Table 3, convex ligands have a curvature index greater than zero (by definition). Interestingly, the convex ligands having higher degrees of curvature (e.g., anions 14 and 16) are the same ones predicted to have relatively low energies of pi-complexation and correspondingly favorable reactivity profiles.

TABLE 3

| Ligand | Curvature Index |
|---|---|
| cyclopentadienyl | 0 |
| 13 | 16 |
| 14 | 39 |
| 15 | 17 |
| 16 | 34 |
| 17 | 22 |

The preceding examples are meant only as illustrations; the following claims define the invention.

We claim:

1. A catalyst system which comprises an activator and an organometallic complex, wherein the complex incorporates a Group 3–10 transition metal and an anionic, polycyclic, convex ligand that is pi-bonded to the metal.

2. The catalyst system of claim 1 wherein the activator is selected from the group consisting of alkyl alumoxanes, alkylaluminum compounds, aluminoboronates, organoboranes, ionic borates, and ionic aluminates.

3. The catalyst system of claim 1 wherein the transition metal is a Group 4 metal.

4. The catalyst system of claim 1 wherein the transition metal is a Group 8–10 metal.

5. The catalyst system of claim 1 wherein the convex ligand is a perannulated cyclopentadienyl anion.

6. The catalyst system of claim 1 wherein the convex ligand is an annulated indenyl or fluorenyl anion.

7. The catalyst system of claim 1 wherein the convex ligand is a boracorannulenyl anion.

8. The catalyst system of claim 1 wherein the convex ligand has a calculated curvature index greater than 15.

9. The catalyst system of claim 1 wherein the convex ligand has a calculated curvature index greater than 25.

10. The catalyst system of claim 1 wherein the convex ligand has a structure selected from the group consisting of:

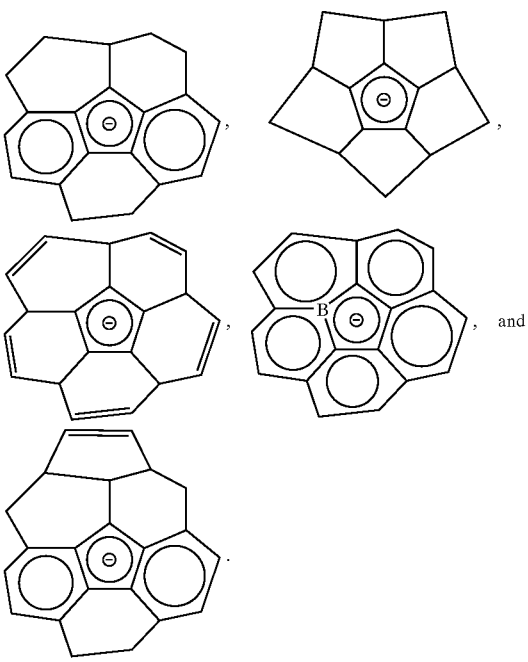

, and

11. A process which comprises polymerizing one or more olefins in the presence of a catalyst system of claim 1.

* * * * *